United States Patent [19]
Olson et al.

[11] 4,063,569
[45] Dec. 20, 1977

[54] TRACT-TAILORED CONTROL MEANS AND METHOD FOR CENTER-PIVOT IRRIGATION APPARATUS

[76] Inventors: Theodore V. Olson; Carroll G. Olson, both of R.R. No. 4, Atkinson, Nebr. 68713

[21] Appl. No.: 743,308

[22] Filed: Nov. 19, 1976

[51] Int. Cl.² .............................................. B05B 3/12
[52] U.S. Cl. .................................. 137/344; 239/177; 239/DIG. 1
[58] Field of Search ................ 137/344; 239/177, 212, 239/213, DIG. 1

[56] References Cited
U.S. PATENT DOCUMENTS 3,608,826   9/1971   Reinke ............................. 137/344 X Primary Examiner—Alan Cohan
Assistant Examiner—Gerald A. Michalsky
Attorney, Agent, or Firm—George R. Nimmer

[57] ABSTRACT

Sprinkler irrigation apparatus of the general type comprising a center-pivot site for the land tract to be irrigated, a generally horizontal water distributing conduit having sprinklers and also underlying traction supports therealong. The outermost underlying support through hydraulic or electric drive means has substantially constant-speed, but driven intermittently for an average-speed as determined by an arbitrarily settable percentage-on timer means. A primary-timer and a secondary-timer (and perhaps a tertiary-timer, etc.), each being arbitrarily set for different percentage-on values, alternatively exclusively control the outermost support drive means according to tract-tailored automatic switching means dictated by peculiarities of the particular land tract to be irrigated from a single center-pivot apparatus.

11 Claims, 7 Drawing Figures

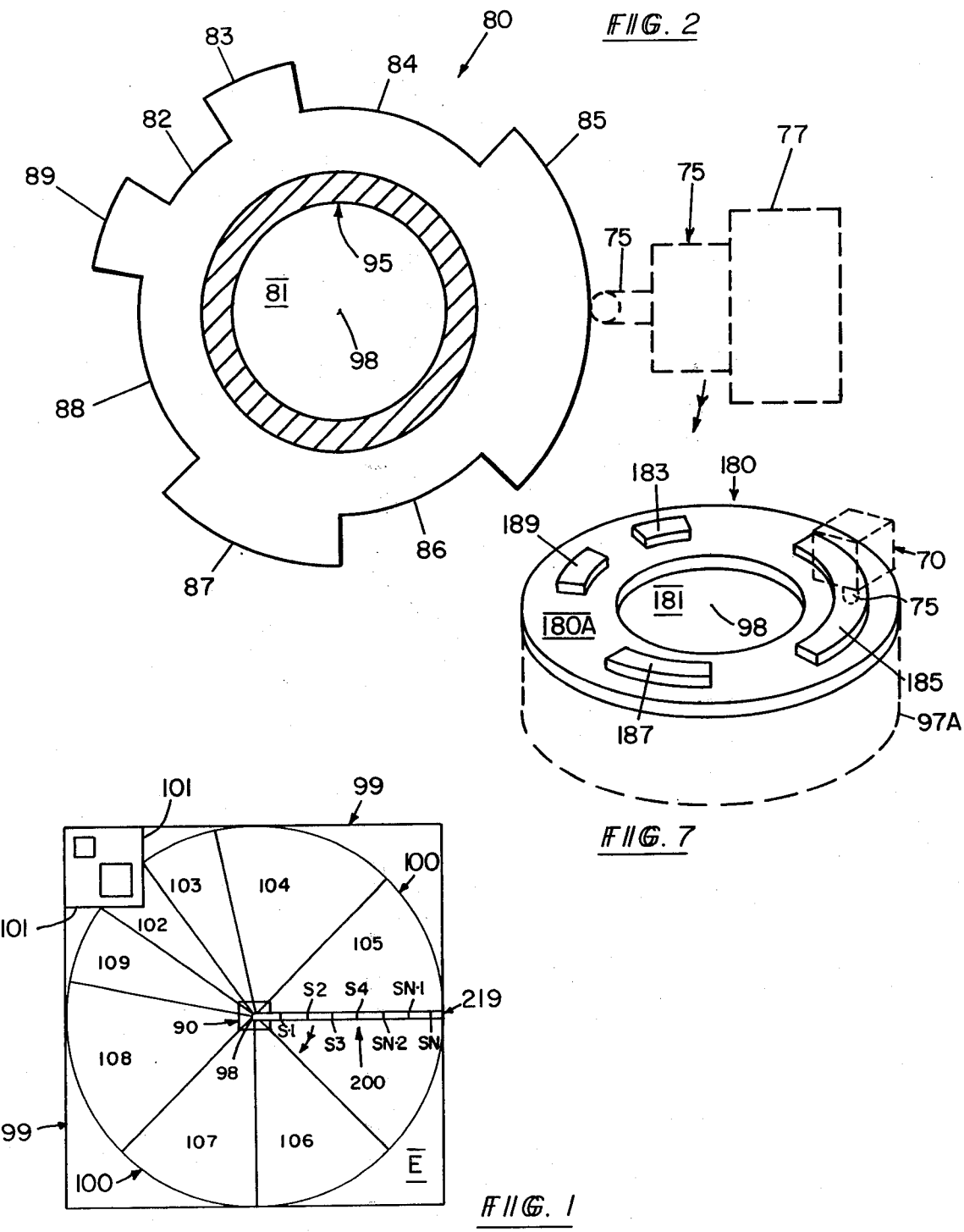

TRACT-TAILORED CONTROL MEANS AND METHOD FOR CENTER-PIVOT IRRIGATION APPARATUS

Center-pivot sprinkler irrigation apparatuses are described in numerous prior patents including inter alia U.S. Pat. Nos. 3,386,661 and 3,608,826. Typically, such center-pivots generally include a central-pillar means securely non-rotatably anchored at a central site of the land tract to be irrigated and extending upwardly along a vertical-axis which is the apparatus center-pivot and having thereat an incoming water supply pipe. There is a generally horizontal lengthy water distributing conduit pivotably attached at its inward-end to the central water supply pipe whereby said lengthy conduit is movable about the center-pivot and the non-rotatable central-pillar. There is a plurality of underlying traction supports disposed at spaced positions along the water distributing conduit and including an outermost support provided with electric-drive for causing it to travel arcuately overland about the center-pivot.

As is also taught by the prior art, the electrical power-path flows from a power-source to the central-pillar site near which there are display-panel and commutator, and thence along the very lengthy water distributing conduit to the electric-drive means for the outermost support. The electric-drive is conventionally a constant speed motor (which is usually dual-directional) which causes the outermost support to travel arcuately overland at substantially constant-speed. However, with prevalent irrigation practice, the outermost support electric-drive is made to run intermittently at regular intervals, as governed by a timer of the arbitrarily settable percentage-on type and located at the display-panel and through which timer the electrical power-path flows. Thus, the outermost support has an average-speed overland determined by the arbitrarily selected percentage-on value for the timer. For example, if the percentage-on value for the timer is arbitrarily set at 60%, then the electric-drive will run 60% of the time and the average-speed is about 60% of the constant-speed.

However, complete reliance upon the single timer control utilized in the prior art is inadequate for many land tract conditions wherein the entire land tract is serviced by a solitary center-pivot apparatus. For example, if two or more intra-tract sectors are planted with different crops having different water requirements per unit land-area, then the average-speed for each land sector should be varied by the apparatus operator. Another example is where a single crop is planted but where a valley-like sector is of such proximity to the water table that lower water application per unit land-area will suffice. Yet another example is where the apparatus oscillates both clockwise and counterclockwise for less than 360° about the center-pivot, as is dictated by a situation where an impassable gully or farmstead occupies a barrier-sector of the land tract. In the barrier-sector example, the freshly-irrigated sectors immediately neighboring the barrier-sector have significantly lower water application requirements per unit land-area than does the remainder of the land tract. Heretofore, the use of a single timer could meet such varying water applications per unit land-area for different sectors only by having the operator repeatedly re-set the timer percentage-on value. However, this is an exceedingly laborious procedure necessitating the operator to expend his valuable time and to repeatedly interrupt his personal schedule whereby he has become practically enslaved by the apparatus control system.

The general object of the present invention is to provide a tract-tailored control means for electric-drive and hydraulic-drive center-pivot irrigation apparatuses wherein water applied per unit land-area from a solitary center-pivot apparatus can be controlled from sector to sector according to the peculiarities of the land tract to be irrigated.

With the above and other objects and advantages in view, which will become more apparent as this description proceeds, the tract-tailored control means generally comprises a primary-timer, and a secondary-timer, and perhaps too a tertiary-timer, etc., on the display-panel and arranged in parallel branches along the electrical power-path, and together with patterned template or other tract-tailored automatic switching means program for causing the electric current to flow alternatively and exclusively through the appropriate timer and according to the pre-programmed exigiencies of the particular land tract to be irrigated with a solitary center-pivot irrigation apparatus.

In the drawing, wherein like characters refer to like parts in the several views, and in which:

FIG. 1 is a schematic plan view of a rectangular land tract serviced by a solitary center-pivot irrigation apparatus and having certain typical sectorial areas which respectively require differing water applications per unit land-area;

FIG. 2 is a top plan view of an apt automatic switching means which is tailored for sectorial water application requirements of the FIG. 1 land tract.

FIG. 7 is a perspective view of an alternate tract-plan embodiment for the land tract shown in FIG. 1.

Figure 4:
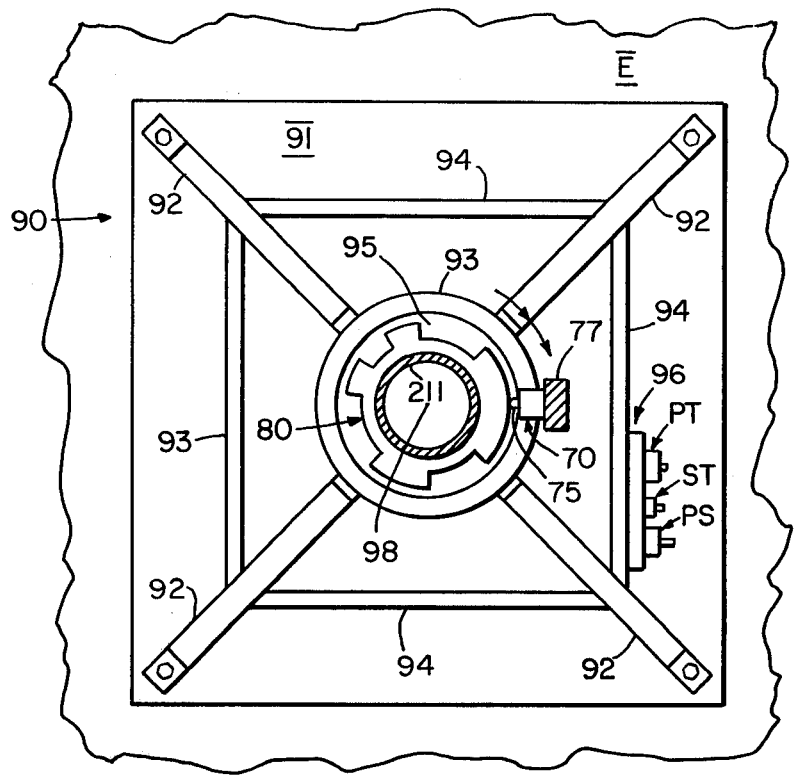
FIG. 4 is a sectional plan view taken along line 4—4 of FIG. 3 wherein the FIG. 2 tract-tailored automatic switching means is employed.

Referring initially to FIG. 1, there is shown schematically a land tract "E" having a rectangular perimeter 99 and a geographic center 98 at which there is a non-rotatably anchored central-pillar assembly 90. The sprinkler irrigation apparatus 200 extends radially outwardly from a vertical-axis center-pivot (herein synonymous with 98) along a generally horizontal water distributing conduit 210 having a plurality of sprinkler nozzles and also underlying traction supports (S1, S2, . . . S(N-1), SN) spaced therealong. Thus, as the water distributing conduit 210 travels overland "E" about its central-pivot (98) inward-end 211, its far-end 219 arcuately circumscribes an irrigatable field which has a generally circular perimeter 100. As had been alluded to in the introductory portion of this application, certain sectorial areas of the land tract to be irrigated might have different water application requirements per unit land-area. A typical, though non-limiting example, might be as seen in FIG. 1. The entire tract bounded by 100 is planted with Crop #1, except for two sectors: a very small unplanted barrier-sector 102 at fence-line obstruction 101; and a 90° sector 105 which is planted with Crop #2 having lower watering requirements than does Crop

1. Sector 107 represents a valley-like depression sector having relatively lower water application requirements per unit land-area, perhaps because of relative proximity to the underground water table. Thus, assuming that irrigation apparatus 200 is of the dual-directional electric-drive means "DM" type and is programmed to reverse its overland travel direction upon attaining the barrier-sector 102 from sectors 103 or 109, these freshly irrigated sectors 103 and 109 have lower water requirements per unit land-area for each pass whereby apparatus 200 should have a higher average-speed in sectors 103 and 109 (relative to sectors 104 and 108).

Thus, a typical drive means ("DM") cycle for conduit 210 overland tract 100 might be as follows: faster at seccctor 103, slower at sector 104, faster at sector 105, slower at sector 106, faster at sector 107, slower at sector 108, faster at sector 109, reversal, faster at sector 109, slower at sector 108, etc. To attain this objective, there is primary-timer "PT", secondary-timer "ST", and tract-tailored automatic switching means affecting through timers "PT" and "ST" the average-speed for the apparatus at outermost support "SN" having electric-drive "DM". For purposes of operational consistency, primary-timer "PT" might be reserved for lower percentage-on values and secondary-timer "ST" for higher percentage-on values, and this convention will be adhered to for the purposes of clarity herein. Herein, as exemplified in FIG. 2, there is a template-form tract-plan 80 having a circular central opening 81 and peripheral lobes and intervening recesses corresponding in angular position and extent to the significant sectorial peculiarities of land tract "E" of FIG. 1. For example, recesses 84, 86, and 88 correspond in angular position and extent for land sectors 104, 106, and 108, respectively, which have relatively high water requirements per unit land-area, and for which actuation of one of the timers e.g. "PT"(but not the other parallel timers e.g. "ST") is necessary. Template lobes 83, 85, and 87 correspond in angular position and extent to land sectors 103, 105, and 107, respectively, which have relatively low water requirements per unit land-area, and for which the secondary-timer "ST"(but not the primary timer "PT") is necessary.

The tract-plan program (e.g. 80, 180, 280, etc.) portion of the tract-tailored automatic switching means for the parallel duty cycle timers ("PT", "ST", etc.) surrounds the center-pivot vertical-axis 98. Tract-plan embodiment 80 non-rotatably surrounds vertical-axis 98, herein stationarily securely surrounding the upright central water supply pipe 95 which non-rotatably surrounds vertical-axis 98. Water supply pipe 95 provides a portion of the non-rotatable central-pillar assembly 90 which typically comprises a concrete footing 91 anchored into the earthen tract "E" at 98, four diagonal braces 92 converging upwardly and inwardly from footing 91 to connect with a collar 93 for pipe 95. Herein are also four horizontal braces 94 for steadying diagonal braces 92 and to which braces 94 the display-panel 96 might be attached. Commutator 97 might also be considered as a part of central-pillar assembly 90. It is to display-panel 96 that the duty cycle timers (e.g. "PT", "ST", etc.) are attached.

In addition to the tract-plan program, the tract-tailored automatic switching means comprises an electrical selector-switch which slavishly follows the sectorial indicators of the tract-plan, there being relative angular movement between the tract-plan and the selector-switch e.g. 70, as the water distributing conduit 210 and the outermost support "SN" move around center-pivot 98. The selector-switch 70 might be of the two-positions "on-off" type such as comprising a spring-loaded pushbutton 75 wherein at its resiliently outwardly extended condition to the selector-switch directs electrical current to flow therefrom to primary-timer "PT" (but not to "ST"). However, when the pushbutton 75 is depressed to the "on" condition 72, as by the prominent sectorial indicators of the tract-plan (80, 180, etc.), electrical current flows to secondary-timer "ST"(but not to "PT"). For the FIG. 2 embodiment, relative angular movement between the tract-plan 80 (which is non-rotatable at stationary pipe 95) and the selector-switch 70 is provided by mounting the selector-switch on the water distributing conduit 210. For example, a bracket 77 depending from conduit section 212 might carry selector-switch 70 at co-elevational relation with tract-plan 80. The pushbutton 75 is perpendicular to vertical-axis 98 and is in continuous contact with the lobed and recessed periphery of tract-plan 80.

Figure 6:
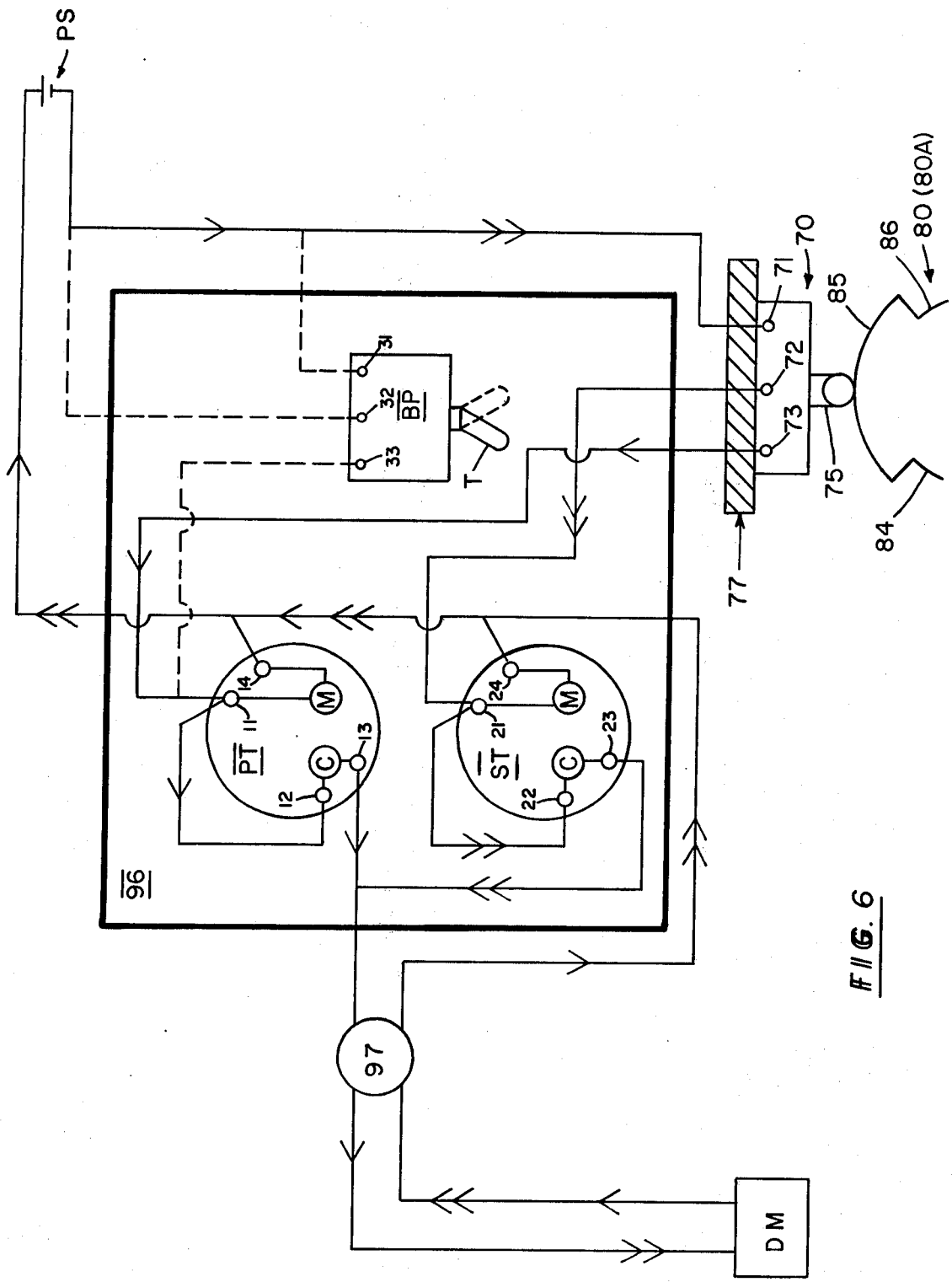
FIG. 6 is an electrical circuitry diagram used for the FIGS. 2-4 and 5 automatic switching means.

Turning now to the electrical circuitry diagram of FIG. 6. There are shown two duty cycle timers "PT" (primary) and "ST"(secondary) attached to the display-panel 96. The two timers "PT" and "ST" are structurally identical and being of the arbitrarily settable percentage-on type as are well known in the prior art including inter alia: U.S. Pat. No. 3,160,719, etc. Each timer identically comprises four external terminals appropriately connected to internal synchronous motor "M" and cam-operated switch "C". An optional bypass-switch "BP" might be attached to display-panel 96, for purposes to be explained later; the electrical wiring for bypass-switch "BP" is shown in broken lines in FIG. 6.

Still referring to FIG. 6, and assuming in FIGS. 1, 2, 4, and 6 (as indicated by double-headed curved arrow) that the conduit 210 and the outermost support "SN" of apparatus 200 are moving clockwise across land sector 105. Thus, the pushbutton 75 of selector-switch 70 (which is co-movable with conduit 210) is depressed by the tract-plan lobe 85 and selector switch 70 is in the "on" condition 72. Accordingly, the electrical power-path is as follows and as indicated in double-arrowheads in FIG. 6; from power-source "PS"; to selector-switch terminal 72; to terminals 21, 22, and then 23 of secondary-timer "ST"; to commutator 97; to drive means "DM" of outermost support "SN"; and back to "PS". Assuming that the secondary-timer "ST" is reserved for higher percentage-on settings than is the primary-timer "PT", this results in conduit 210 passing relatively quickly through land sector 105. However, when conduit 210 enters land sector 106, selector-switch pushbutton 75 is allowed to outwardly extend at tract-plan recess 86 whereupon the selector-switch 70 is in the "off" condition 73. Accordingly, the electrical power-path, as indicated in single-arrowheads in FIG. 6, proceeds: from power-source "PS"; to selector-switch terminal 73; to terminals 11, 12, and then 13 of primary-timer "PT"; to commutator 97; to drive means "DM" of outermost support "SN"; and back to "PS". This results in conduit 210 passing appropriately relatively slower through land sector 106 as compared to land sector 105. Next, as conduit 210 enters land sector 107, secondary-timer "ST" again controls the drive means "DM", etc.

Figure 5:
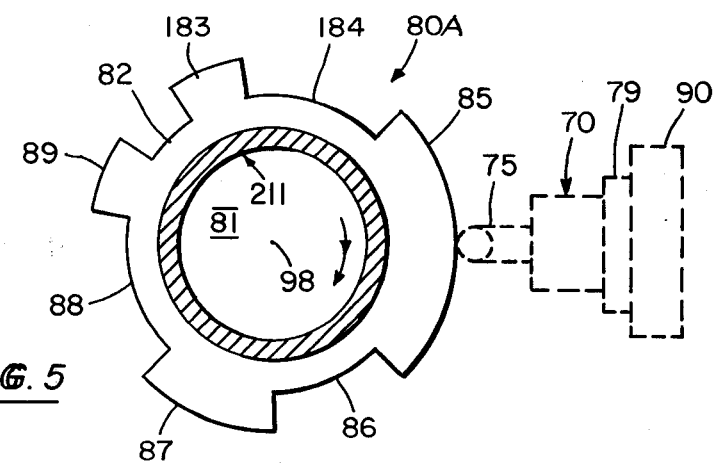
FIG. 5 is a top plan view of an alternate form of the FIG. 2 automatic switching means and also adaptable for the FIG. 1 land tract.
Figure 3:
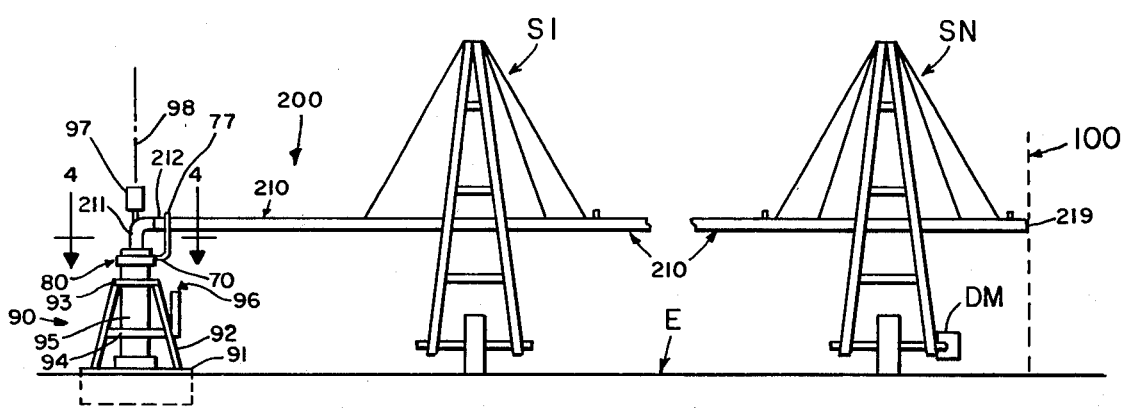
FIG. 3 is an elevational view of the center-pivot irrigation apparatus alluded to in FIG. 1 including therewith the tract-tailored control means of FIG. 2.

FIG. 5 alludes to another method of providing relative angular movement between the tract-plan 80 and the selector-switch 70. Tract-plan 80 securely surrounds elbow 211 and is co-rotational therewith about central-pivot 98. Selector-switch 70 is stationarily attached to the central-pillar 90 as with mounting bracket 79 whereby selector-switch 70 is non-rotatable about center-pivot 98.

FIG. 7 alludes to an alternate tract-plan embodiment 180 for land tract "E" of FIG. 1. Tract-plan embodiment 180 comprises a circular base-plate 180A having a central-opening 181 at center-pivot 98. Base-plate 180A is securely attachable to the commutator housing 97A and hence non-rotatable about center-pivot 98. Equidistant from central-opening 181 are projections (183, 185, 187, and 189) upstanding from base-plate 180A and corresponding in angular position and extent for land sectors 103, 105, 107, and 109, respectively. Selector-switch 70 is co-movable with conduit 210 and its upright push-button 75 (parallel to vertical-axis 98) slavishly follows the projections 183, 185, 187, and 189, and the intervening unobstructed base-plate 180A. Thus, the tract-plan 180 together with the selector-switch 70 provide a tract-tailored automatic switching means between timers "PT" and "ST", analagous to that already described.

Bypass-switch "BP" of FIG. 6 might be a double-throw switch having a manually-operated toggle "T" which can result in the electrical power-path being permanently shunted via terminal 33 to the primary-timer "PT"(and to the indefinite exclusion of secondary-timer "ST"). This optional procedure might be used, inter alia: when the water application rates per unit-area should be made substantially constant throughout entire land tract "E", for rapidly repositioning apparatus 200, etc. However, manipulation of toggle "T" will once again allow the electric power-path to flow via terminal 31 to secondary-timer "ST" during appropriate land sectors as dictated by the tract-plan e.g. 80, 180.

The tract-tailored control means apparatus and method of the present invention entail the tailor-making step of a predetermined tract-plan program (e.g. 80, 180) having prominent indicators (e.g. 85, 185, etc.) corresponding to sector-to-sector irrigation requirements. This is necessarily an empirical procedure requiring a sector-to-sector water requirements appraisal for the particular land tract to be irrigated. Thus far it has been illustrated that two different average-speeds for apparatus 200 (and hence two different water application rates per unit land-area) will meet all the sectorial peculiarities for the land tract "E". On this basis, two parallel timers ("PT" and "ST") would suffice. Conceiveably, however, sector-to-sector land appraisal might conclude that three, or even more, vastly different water application rates might be appropriate for servicing by a solitary apparatus 200. In such situations, additional duty cycle timers e.g. tertiary-timer, etc., would need to be placed in parallel with the respective parallel timers "PT" and "ST". Tract-plan and selector-switch appropriate to tertiary and higher ordinal parallel timers might take analagous form. Relative to the addition of a tertiary-timer, there could be two separate tract-plans analagous to 80 and each having its own selector-switch 70, the first tract-plan having lobes actuating the secondary-timer and the second tract-plan having lobes for actuating the tertiary-timer.

From the foregoing, the construction, operation, and method steps for the tract-tailored control means will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. In a self-propelled sprinkling irrigation apparatus including a vertical-axis center-pivot and a central water supply pipe at a non-rotatable central-pillar site of the land tract to be irrigated, a generally horizontal lengthy water distributing conduit extending radially outwardly from the center-pivot and water supply pipe and having a plurality of underlying traction supports spaced therealong, the outermost support being provided with drive means which whenever operating causes said outermost support to move arcuately overland at substantially constant-speed, and an electrical power-path flowing from a power-source through said central-pillar and thence through a nearby display-panel carrying a duty cycle primary-timer which is of the arbitrarily settable percentage-on type whereby the outermost support is driven intermittently at an overland average-speed determined by the arbitrarily set percentage-on proportion of constant-speed, the improvement of a tract-tailored control means for establishing at least two different average-speeds for the irrigation apparatus according to sector-to-sector water requirement peculiarities of the particular land tract to be irrigated by a solitary irrigation apparatus, said control means comprising:

A. A secondary-timer of the said arbitrarily settable percentage-on duty cycle type and located on the display-panel, said primary-timer and secondary-timer being arranged in parallel branches along the power-path circuitry; and B. Tract-tailored automatic switching means for causing electrical power to flow alternatively and exclusively through the respective duty cycle timers according to sectorial peculiarities of the land tract to be irrigated with said solitary center-pivot apparatus.

2. The control means of claim 1 wherein there is electric-drive means; and wherein the tract-tailored automatic switching means comprises: a tract-plan program indicating sectorial water requirement peculiarities for the land tract to be irrigated, and electrical selector-switch means located in series between the power-source and the parallel duty cycle timers, there being relative angular movement between the tract-plan and the selector-switch with the selector-switch slavishly following the sectorial peculiarities of the tract-plan whereby the electrical power-path is made to flow alternatively and exclusively through the respective parallel timers.

3. The control means of claim 2 wherein the tract-plan program is of template-form having lobed and recessed peripheral indicators corresponding in angular extent and position to the sectorial water irrigation peculiarities for the particular land tract to be irrigated; and wherein the selector-switch slavishly follows the template periphery.

4. The control means of claim 3 wherein the template-form program stationarily surrounds the vertical-axis center-pivot and the selector-switch is co-movable with the water distributing conduit.

5. The control means of claim 3 wherein the template-form program surrounds the vertical-axis center-pivot and is co-movable with the water distributing conduit, the selector-switch being stationarily attached to the non-rotatable central-pillar.

6. The control means of claim 2 wherein the timers progression consists of a primary-timer and a secondary-timer; and wherein the selector-switch is of the on-off type whereby electrical current flows exclusively to the primary-timer whenever the selector-switch is turned "off" by the tract-plan indicators and flows exclusively to the secondary-timer whenever the selector-switch is turned "ON" by the tract-plan indicators.

7. The control means of claim 6 wherein the tract-plan program comprises a base-plate perpendicularly intersecting the center-pivot vertical-axis, and also projections upstanding from the base-plate and corresponding in angular position and extent from the vertical-axis to the sectorial peculiarities for the particular land tract to be irrigated; and wherein the selector-switch comprises a pushbutton that is substantially co-parallel to the center-pivot vertical-axis.

8. The control means of claim 2 wherein there is a bypass-switch interposed between the power-source and the selector-switch and which bypass-switch is capable of shunting electrical current to the primary-timer and to the exclusion of the secondary-timer.

9. The control means of claim 8 wherein the timers progression comprises a primary-timer and a secondary-timer; and wherein the selector-switch is of the two-positions on-off type having a pushbutton slavishly following the sectorial indicators of the tract-plan whereby electrical current flows exclusively to the secondary-timer whenever the selector-switch is turned "on" by the indicative tract-plan.

10. The method for establishing at least two distinctly different overland average-speeds for a center-pivot self-propelled sprinkling irrigation apparatus servicing a land tract having sectorial peculiarities necessitating different water application densities per unit land-area, said center-pivot apparatus including a central water supply pipe at a non-rotatable central-pillar, a generally horizontal lengthy water distributing conduit extending radially outwardly from the center-pivot vertical-axis and water supply pipe and having a plurality of underlying traction supports spaced therealong, the outermost support being provided with drive means which whenever operating causes said outermost support to move arcuately overland at sustantially constant-speed, a display-panel nearby the central-pillar and carrying a duty cycle primary-timer means which is of an arbitrarily settable percentage-on class whereby the apparatus is driven at an overland average-speed, said method comprising the following steps:

A. Making a tract-plan having prominent indicators thereon corresponding to appraised sector-to-sector water requirement peculiarities for the land tract to be irrigated;

B. Attaching a duty cycle secondary-timer means of said percentage-on class at the display-panel and placing said secondary-timer means in parallel with the primary-timer means with respect a power-path;

C. Selecting different percentage-on settings for the primary-timer and for the secondary-timer means;

D. Placing a selector-switch means into the power-path and in series with the parallel timer means; and E. Mounting the tract-plan program and the selector-switch means onto the center-pivot irrigation apparatus so that the tract-plan program sectorial indicators surround the center-pivot vertical-axis and so that there is relative angular movement therebetween with the selector-switch slavishly following the tract-plan sectorial indicators as the outermost support moves arcuately overland about the center-pivot vertical-axis whereby power is caused to flow alternatively and exclusively through the respective duty cycle timer means.

11. The method of claim 10 wherein the power-path is electrical and the outermost support is provided with electric-drive; wherein the respective timer means are of the electrical type; wherein the tract-plan program is made of template-form having lobed and recessed periphery corresponding to sectorial water requirement peculiarities for the land tract and said template being mounted to stationarily surround the center-pivot vertical-axis; and wherein the selector-switch is electrical and mounted co-movable with the water distributing conduit and thereby slavishly following the lobed and recessed periphery of the tract-plan as the outermost support and water distributing conduit move arcuately overland.

* * * * *